United States Patent Office

3,101,365
Patented Aug. 20, 1963

3,101,365
PREPARATION OF TETRACYANOETHYLENE BY REACTING CYANOCARBON SULFIDES WITH METAL CYANIDES, FOLLOWED BY OXIDATION
Robert D. Vest, Wilmington, Del., assignor to E. I. du Pont de Nemours and Company, Wilmington, Del., a corporation of Delaware
No Drawing. Filed Oct. 4, 1960, Ser. No. 60,297
4 Claims. (Cl. 260—465.8)

This invention relates to a new process for preparing tetracyanoethylene.

The discovery of tetracyanoethylene a few years ago opened an entirely new chapter of organic chemistry, that of cyanocarbons. This new chemistry has grown tremendously in a short span, as witnessed by the large number of publications in this field. An excellent summary of the history and development of tetracyanoethylene and its derivatives is found in an article by McKusick and Biehm in Chem. Eng. News, 38, No. 15, 114–124 (1960). From the technological standpoint, tetracyanoethylene is a prolific source of new chemicals useful in many and various applications, as shown by the issuance in recent years of some thirty U.S. patents on valuable new compounds of the most diverse kinds, all requiring tetracyanoethylene as the starting material in their preparation. To cite only one of the many uses of tetracyanoethylene, it has been shown to react with tertiary aromatic amines. The reaction is general and leads to a new class of dyes containing the tricyanovinyl group. These dyes are intensely colored and give brilliant orange, red or blue dyeings on synthetic hydrophobic fibers such as polyethylene terephthalate and polyacrylonitrile.

The presently known methods of synthesis of tetracyanoethylene are not free from disadvantages in that they require expensive, not readily available starting materials and in general rather complex procedures. The development of cyanocarbon chemistry has been hampered by the lack of a practical, relatively inexpensive method of synthesis of tetracyanoethylene. The object of the present invention is to provide such a method. A further object of the invention is to provide a novel process for producing the tetracyanoethylene ion radical.

As background for a better understanding of this invention, the following preliminary discussion may be helpful. As shown in coassigned patent application Serial No. 12,975, filed on March 7, 1960, by S. I. Weissman, tetracyanoethylene is capable of forming metal tetracyanoethylenides in which tetracyanoethylene moiety is in the form of an ion-radical carrying a completely transferred electron. This ion-radical has an ionic charge of $-1$ in the conventional sense. When compounds containing it are examined in dilute solution by the techniques for determining electron paramagnetic resonance, they show a characteristic line spectrum in which the relative intensity ratios of the lines are

1:4:10:16:19:16:10:4:1 and the spacing between lines is $1.60 \pm 0.01$ gauss. This is a sensitive test for the presence of the tetracyanoethylene anion-radical. This anion-radical may be variously depicted by the formulas

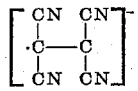

or

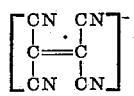

or, in a simpler form, $(C_6N_4 \cdot {}^-)$. The metal tetracyanoethylenides may be represented by $M^{+x}(C_6N_4 \cdot {}^-)_x$, where $x$ is the valence of the metal, for example $$K^+(C_6N_4 \cdot {}^-)$$

for potassium tetracyanoethylenide. These compounds can be prepared by the reaction of tetracyanoethylene with the elemental metal, or with metal salts having nucleophilic anions capable of reducing tetracyanoethylene, e.g., metal iodides, cyanides or mercaptides.

In has further been found that the tetracyanoethylene ion-radical can be reconverted to tetracyanoethylene by treatment with certain oxidizing agents. In its broad scope this oxidation process is described and claimed in coassigned application Ser. No. 58,634, filed by O. W. Webster on September 27, 1960, now abandoned in favor of two continuation-in-part applications, Serial Nos. 163,034 and 163,076, both filed on December 29, 1961.

The present invention is based on the discovery of a method whereby the tetracyanoethylene ion-radical is prepared from relatively inexpensive, readily obtainable starting materials, rather than from tetracyanoethylene itself, and then converted directly, without isolating it, to tetracyanoethylene by treatment of the reaction mixture containing it with inexpensive oxidizing agents.

In accordance with this invention, tetracyano ethylene is prepared by a process which comprises (a) reacting a heterocyclic cyanosulfide of the formula $C_8N_4S_n$, where $n$ is 2 or 3, and whose molecule contains one of the segments

as part of the heterocyclic ring, with a cyanide of an alkali or alkaline earth metal, in an organic liquid medium which is at least a partial solvent for the reactants and for tetracyanoethylene; and (b) treating the reaction mixture obtained in step (a) with chlorine or bromine.

The cyclic cyanosulfides which serve as starting materials in this process are the following compounds:

(I) Tetracyano-1,4-dithiin,

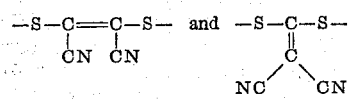

(II) P-dithiino-[c]-isothiazole-3,5,6-tricarbonitrile,

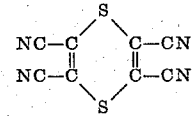

(III) 4,5-dicyano - 1,3 - dithiole - $\Delta^{2,\alpha}$ - malononitrile, also called 2-dicyanomethylene-4,5-dicyano-1,3-dithiolene,

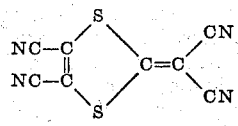

(IV) A cyanosulfide of formula $C_8N_4S_3$, whose structure, on the basis of infrared and ultraviolet spectral data, is that of an isothiazole derivative,

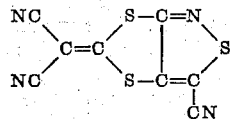

i.e., 3-cyano-[1,3]-dithiolo-[4,5-c]-isothiazole - $\Delta^{5,a}$ - malononitrile.

Of the above cyanosulfides, the preferred one is tetracyano-1,4-dithiin, which is readily prepared from inexpensive reactants (carbon disulfide, sodium cyanide and chlorine).

When these cyanosulfides are reacted with an alkali or alkaline earth metal cyanide in step (a) of the above-defined process, the tetracyanoethylene anion radical is formed, and its presence in the reaction mixture can be shown by electron paramagnetic resonance analysis, or by examination of the visible spectrum in the 400–465 m$\mu$ region. Other reaction products, whose nature is not known with certainty in all cases, are also formed from the cyanosulfide. In the case of tetracyano-1,4-dithiin, the reaction is believed to proceed as shown in the following Equation a, where potassium cyanide is used as the illustrative metal cyanide:

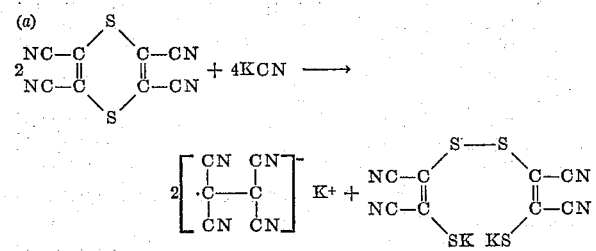

Evidence for the formation of dipotassium bis[(1,2-dicyano-2-mercapto)vinyl]disulfide as the coproduct in the above reaction is given by the absorption in the visible spectrum at 378 m$\mu$. Further evidence is that, in the oxidation step (b), where the tetracyanoethylene ion radical is converted to tetracyanoethylene, there is simultaneous regeneration of tetracyano-1,4-dithiin with liberation of sulfur, appearently through concurrent oxidation of the dipotassium bis[1,2-dicyano-2-mercapto) vinyl]disulfide. The course of the oxidation step is shown in the following Equation b, in which chlorine is used as the illustrative oxidizing agent:

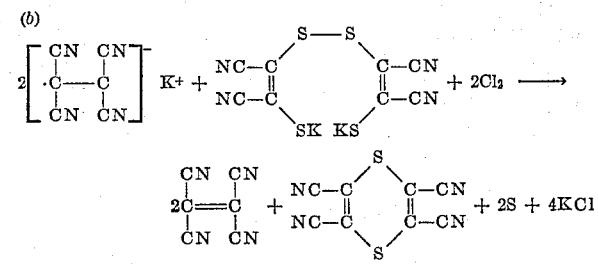

This fact, incidentally, represents an important advantage of this process since at least some of that portion of the tetracyano-1,4-dithiin which is not converted to tetracyanoethylene can be recovered and used again. The byproduct sulfur can also be recovered if desired, either as such or in the form of the sulfur halides which tend to form in the oxidation step through side reactions of the halogen used with elemental sulfur.

The inorganic reactant in the first step of the process is an alkali or alkaline earth metal cyanide, for example sodium, potassium, rubidium, cesium, calcium or barium cyanide. The preferred reactants are the cyanides of alkali metals of atomic number 11 to 55, and especially sodium and potassium cyanides.

Preferably, though not essentially, the metal cyanide is used in proportions such that at least about two CN$^-$ ions are available per mole of cyanosulfide. This amounts to using, per mole of cyanosulfide, at least about two moles of alkali metal cyanide or about one mole of alkaline earth metal cyanide. The metal cyanide can be used in excess over this amount, and is desirably so used in the preferred procedure, described below, wherein the two steps of the process are carried out in separate reaction zones.

The reaction is conducted in an organic liquid medium which is at least a partial solvent for the rectants and tetracyanoethylene. The cyanosulfides are soluble in most organic solvents and thus offer no solubility problems. The metal tetracyanoethylenide is also appreciably soluble in most solvents, as is tetracyanoethylene itself. As to the metal cyanide, it need be soluble only to a very small extent, which may be as low as 0.01% by weight. The reaction medium should, of course, be substantially inert towards reactants and reaction products under the operating conditions. Preferably, it should also not be unduly reactive with halogens, so that the second step can be carried out in the same medium, although some degree of reactivity with chlorine or bromine can be tolerated. Suitable reaction media are organic compounds, liquid at reaction temperature and free of non-aromatic carbon-to-carbon unsaturation, which consist only of carbon, hydrogen and at least one additional element, the latter being one or more of the elements oxygen, sulfur and nitrogen, the hydrogen atoms being attached only to carbon, i.e., the compound being free of active hydrogen, that is, of hydrogen detectable by the well-known Zerewitinoff test. Examples of such compounds include acyclic or cyclic ethers such as di-n-butyl ether, 1,2-dimethoxyethane, 1,2 - diethoxyethane, tetrahydrofuran, dioxane, anisole; carboxylic acid esters such as methyl acetate, ethyl acetate, n-octyl acetate, methyl butyrate, ethyl benzoate; nitriles such as acetonitrile, propionitrile, butyronitrile, adiponitrile, benzonitrile; nitro and nitroso compounds such as nitromethane, nitroethane, nitrobenzene, p-nitrotoluene, methyl p-nitrobenzoate, N-nitrosodimethylamine; N,N-dihydrocarbyl amides such as N,N-dimethylformamide, N,N-dimethylacetamide, tetramethylurea; sulfides, sulfoxides and sulfones such as diethyl sulfide, di-n-butyl sulfide, dimethyl sulfoxide, diethyl sulfoxide, tetramethylene cyclic sulfone; and the like. The preferred reaction media are the aliphatic nitriles, aliphatic diethers, cyclic ethers and N,N-dihydrocarbyl amides, and especially such compounds which have from one to ten carbon atoms. The reaction medium need not be strictly anhydrous. In fact, addition of a little water aids in dissolving the metal cyanide and is sometimes advantageous, provided the amount present is insufficient to cause undesirably rapid hydrolysis of the tetracyanoethylene. Thus, the presence of up to 10% by weight of water based on the total weight of the reaction medium can be tolerated. The amount of reaction medium present is not critical. In practice, it is convenient to use the reaction medium in amounts ranging from about 3 to about 100 times the weight of the cyanosulfide.

The reaction between the cyanosulfide and the metal cyanide is spontaneous and rapid and requires no external heat. In fact, it is mildly exothermic. Thus, the temperature in this step is not critical. The reaction takes place at external temperatures as low as —50° C. There is no special advantage in operating at temperatures above about 25° C., although mild heating can be used if desired, e.g., up to 125° C. The preferred range of operating temperature is that between —15 and 50° C. Only a short contact time is necessary, of the order of a few minutes to about one hour. Organic solvent solutions containing the tetracyanoethylene ion radical are dark brown in color and the reaction can be discontinued when the intensity of the color no longer increases appreciably.

It is desirable, though not essential, to prevent access of oxygen to the reaction vessel, as it has a deleterious effect on metal tetracyanoethylenides. However, rigorous exclusion of oxygen is not necessary, and the process can even be conducted in the presence of air.

In one mode of practicing this step of the process, the cyanosulfide, preferably in solution in a suitable solvent, is added, gradually or at once, to the metal cyanide in partial or complete solution in the same or another solvent, and the reaction is allowed to take place. Alternatively, the order of addition of the two reactants is reversed. In either case, stirring of the reaction mixture is beneficial. In another method of operation, which is preferred because it generally gives better yields, a solution of the cyanosulfide in a suitable solvent is flowed through a column packed with the solid metal cyanide in excess. This latter procedure, in which the reaction zone for this step is separate from that used in the subsequent oxidation step, also has the advantage of permitting continuous or semi-continuous operation. In either method, there is obtained as the reaction product a solution containing the metal tetracyanoethylenide and the coproduct. This solution is then treated directly with the oxidizing agent to produce tetracyanoethylene.

The oxidation step is conducted by bringing the halogen (chlorine or bromine) in amounts of at least one mole per mole of cyanosulfide employed, and preferably in slight excess thereover, in contact with the reaction product directly as obtained from the first step, i.e., the solution containing the metal tetracyanoethylenide and any coproduct that may be present. The procedure consists simply in passing gaseous chlorine through the solution or in adding liquid bromine to it, gradually or at once, if desired dissolved in one of the suitable solvents defined above. The end of the reaction is indicated by the disappearance of the dark brown color characteristic of the tetracyanoethylene ion-radical. This color is discharged, leaving as the reaction product a light colored solution, generally pale yellow or yellow-orange, which may contain in suspension the inorganic by-products (metal halide and sulfur).

In order to minimize side reactions, such as halogenation of the solvent, the treatment with chlorine or bromine is desirably performed at a temperature not appreciably exceeding about 30° C. It can be done at very low temperatures, e.g., —50° C., the preferred temperature range being that between —30 and +25° C.

Recovery of the tetracyanoethylene from the reaction mixture after oxidation is conveniently effected by separating any solids present in the reaction mixture by filtration (this step, however, is by no means essential) and evaporating most or all of the solvent from the filtrate. The tetracyanoethylene can be isolated from the other materials present in the residue by sublimation, preferably under reduced pressure, or by other methods such as extraction with an appropriate solvent. For many uses, for example the preparation of derivatives such as tricyanovinyl aromatic amines, isolation of the tetracyanoethylene is not essential since the reaction can be carried out directly in the solution.

The various cyanosulfides suitable for use in the process of this invention can be prepared by the methods described below.

(I) TETRACYANO-1,4-DITHIIN

This compound is most conveniently prepared by reaction of disodium dimercaptomaleonitrile with either sulfur monochloride, sulfur dichloride, thionyl chloride or sulfuryl chloride in an inert solvent. Sulfur and chlorine may be used instead of a preformed binary sulfur chloride, and very small amounts of sulfur are sufficient since sulfur is liberated during the reaction. The process is represented by the following illustrative equations using $SOCl_2$ and $SCl_2$:

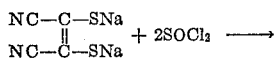

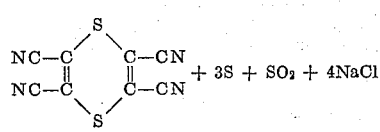

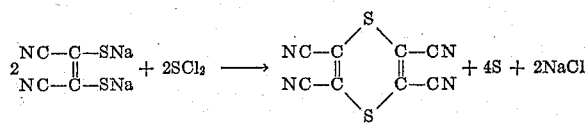

The starting material, disodium dimercaptomaleonitrile, has been described by Bahr and Schleitzer in Ber., 90, 438 (1957). It is a yellow crystalline solid, readily prepared by spontaneous coupling, with loss of sulfur, of sodium cyanodithioformate in water or chloroform solution. Sodium cyanodithioformate is itself prepared by reaction of sodium cyanide with carbon disulfide. Two examples of the preparation of tetracyano-1,4-dithiin follow.

(A) To a stirred suspension of 3 g. of disodium dimercaptomaleonitrile in 30 ml. of 1,2-dimethoxyethane at 0° C. was added over a 40-minute period a solution of 1.92 g. of thionyl chloride in 5 ml. of 1,2-dimethoxyethane. The wine-red color which developed during the reaction faded rapidly near the end of the addition, leaving a pale yellow suspension. This suspension was filtered free of sodium chloride and sulfur, and the filtrate was diluted with 100 ml. of petroleum ether. There was thus obtained 1.8 g. (100% yield) of tetracyano-1,4-dithiin as a tan precipitate. It was recrystallized twice from toluene to give the pure product as bright yellow needles, M.P. 207–209° C.

*Analysis.*—Calc'd for $C_8N_4S_2$ (wt. percent): C, 44.43; N, 25.91; S, 29.66. Found (wt. percent): C, 44.63; N, 25.89; S, 29.96.

(B) A suspension of 0.1 g. of sulfur in 30 ml. of 1,2-dimethoxyethane was stirred at 0° C. for 10 minutes with a slow stream of chlorine passing into the suspension. Three grams of disodium dimercaptomaleonitrile was then added all at once. The addition of chlorine was continued for about 1.5 hours until the deep red color of the reaction mixture had faded to yellow. The mixture was filtered and the filtrate was diluted with petroleum ether. The buff-colored tetracyano-1,4-dithiin which precipitated weighed 1.40 g. (80% yield). It melted at 208–209° C. without purification.

(II) P-DITHIINO-[c]-ISOTHIAZOLE-3,5,6-TRICARBONITRILE

This product is obtained, together with tetracyano-1,4-dithiin, by reaction of disodium dimercaptomaleonitrile, see (I) above, with 1,2-dichloro-1,2-dicyanoethylene. The latter is prepared by known methods (U.S. Patent 2,443,494) and it can be used either in the cis form (dichloromaleonitrile) or in the trans form (dichlorofumaronitrile).

To a stirred and cooled suspension of 22.2 g. of disodium dimercaptomaleonitrile in 350 ml. of 1,2-dimethoxyethane was added 17.4 g. of dichloromaleonitrile. An exothermic reaction occurred and the mixture became deep red in color. Stirring was continued at room temperature for 72 hours. The suspended solid material was collected by filtration and washed with a little 1,2-dimethoxyethane. This solid consisted largely of sodium chloride and sulfur. The filtrate was evaporated to dryness in a stream of nitrogen. The solid residue so obtained was extracted with 500 ml. of warm benzene, giving a solution and a crystalline residue sparingly soluble in benzene. Sublimation of the solid residue at 140–150° C. and 1 mm. pressure gave 6 g. of somewhat impure tetracyano-1,4-dithiin, M.P. 196–198° C. Recrystallization from hot benzene gave 5.5 g. of the essentially pure material, M.P. 207–208° C.

The benzene extract obtained as described above was evaporated to about half its original volume and cooled in ice. There was collected 10.2 g. of a yellow crystalline product, M.P. 174–176° C. An additional 3.1 g. of this product was obtained from the filtrates for a total yield of 13.3 g. Recrystallization of this material from benzene gave pure p-dithiino-[c]-isothiazole-3,5,6-tricarbonitrile as yellow needles, M.P. 181–182° C.

*Analysis.*—Calc'd for $C_8N_4S_3$ (wt. percent): C, 38.69; N, 22.56; S, 38.74. Found (wt. percent): C, 39.46; N, 22.59; S, 38.58.

Spectral analysis of this product shows the following characteristic absorption bands:

Ultraviolet ($\lambda$ max. in $CH_2Cl_2$): 240 m$\mu$ ($\epsilon=11,400$); 268 m$\mu$ ($\epsilon=6950$); 285 m$\mu$ ($\epsilon=7950$); 334 m$\mu$ ($\epsilon=19,500$); and a possible shoulder at 350 m$\mu$ ($\epsilon=3850$).

(III) 4,5-DICYANO-1,3-DITHIOLE-$\Delta^{2,\alpha}$-MALONONITRILE

This product is prepared by the reaction of 1,2-dichloro-1,2-dicyanoethylene [i.e., dichloromaleonitrile or dichlorofumaronitrile, see (II) above] with dipotassium (or disodium) 1,1-dimercapto-2,2-dicyanoethylene, in accordance with the equation:

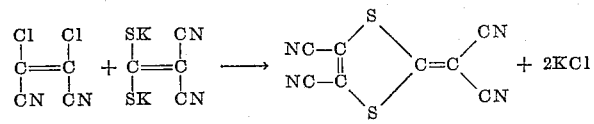

(A) *Dipotassium 1,1-Dimercapto-2,2-Dicyanoethylene*

In a one-liter, three-neck flask fitted with a stirrer, thermometer, and dropping funnel was placed a solution of 60 g. of potassium hydroxide in 650 ml. of denatured ethyl alcohol. The solution was cooled to 0° C. and 35.4 g. (0.536 mole) of freshly distilled malononitrile was added all in one portion, followed by the dropwise addition of 41 g. (0.54 mole) of carbon disulfide at 0–10° C. Toward the end of the addition, a canary-yellow salt began to precipitate. After stirring for one hour more at 0–5° C., the solid was collected on a filter and washed with 50 ml. of cold ethyl alcohol. After drying to constant weight at 80° C. and less than 1 mm. pressure, there was obtained 109 g. (94% yield) of dipotassium 1,1-dimercapto-2,2-dicyanoethylene as a yellow water-soluble solid which did not melt below 250° C.

*Analysis.*—Calc'd for $C_4N_2S_2K_2$ (wt. percent): C, 22.01; S, 29.36. Found (wt. percent): C, 21.76; S, 29.23.

(B) *4,5-Dicyano-1,3-Dithiole-$\Delta^{2,\alpha}$-Malononitrile*

To a solution of 2.50 g. (0.0115 mole) of dipotasssium 1,1-dimercapto-2,2-dicyanoethylene in 50 ml. of methanol was added in one lot 1.47 g. (0.01 mole) of dichlorofumaronitrile at room temperature. After stirring for 15 minutes, the reaction mixture was poured into 300 ml. of water and the solid which precipitated was collected on a filter (1.12 g.). Recrystallization from hot toluene after treatment with decolorizing carbon yielded 0.99 g. of yellow needles, M.P. 208–209° C. This was shown by elemental and spectral analyses to be 4,5-dicyano-1,3-dithiole-$\Delta^{2,\alpha}$-malononitrile.

*Analysis.*—Calc'd for $C_8N_4S_2$ (wt. percent): C, 44.43; S, 29.64. Found (wt. percent): C, 43.97; S, 30.01.

Further recrystallizations from toluene gave a product of somewhat higher melting point (212–214° C.).

(IV) 3-CYANO-[1,3]-DITHIOLO-[4,5-c]-ISOTHIAZOLE-5,$\alpha$ MALONONITRILE

This compound is prepared by sulfurization, with elemental sulfur, of 4,5-dicyano-1,3-dithiole-$\Delta^{2,\alpha}$ malononitrile (compound III above) in alkaline medium. The reaction is preferably conducted in alcohol solution in the presence of small amounts, e.g., 0.05–0.10 mole per mole of cyanosulfide, of sodium ethoxide, if desired using a cosolvent such as tetrahydrofuran to increase the solubility of the reactants and reaction product. A preparation is described below.

A solution of 4,5-dicyano-1,3-dithiole-$\Delta^{2,\alpha}$-malononitrile (1.08 g., 5 millimoles) in 10 ml. of absolute alcohol and 15 ml. of tetrahydrofuran was added to a boiling solution of 0.24 g. (7.5 millimoles) of sulfur in 10 ml. of absolute alcohol and 15 ml. of tetrahydrofuran to which 0.02 g. of a 55% sodium hydride emulsion in mineral oil had been added. The reaction mixture was boiled 15 minutes, diluted with 50 ml. of alcohol and cooled in an ice bath. The fine yellow needles that formed were collected and dried in air. There was thus obtained 1.20 g. (100% yield) of 3-cyano-[1,3]-dithiolo-[4,5-c]-isothiazole-$\Delta^{5,\alpha}$-malononitrile, a yellow solid melting at 215–218° C. and which has the following characteristic absorption bands:

Infrared: 4.5$\mu$ (strong), 6.7$\mu$ (strong), 6.75$\mu$ (strong), 7.73$\mu$ (strong), 8.7$\mu$, 10.1$\mu$, 10.3$\mu$, 10.85$\mu$, 11.4$\mu$, 11.9$\mu$ and 12.4$\mu$ (strong).

Ultraviolet ($\lambda$ max. in $CH_2Cl_2$): 282 m$\mu$ ($\epsilon=6830$), 355 m$\mu$ ($\epsilon=30,700$) and 368 m$\mu$ ($\epsilon=35,200$). Infrared analysis showed this product to be identical to that obtained in another preparation, which melted at 219–220° C. and had the following composition:

*Analysis.*—Calc'd for $C_8N_4S_3$ (wt. percent): C, 38.8; N, 21.7; S, 38.7. Found (wt. percent): C, 39.3; N, 21.4; S, 38.6.

The invention is illustrated in greater detail by the following examples.

EXAMPLE I

A suspension of 1.68 g. (0.025 mole) of potassium cyanide in 50 ml. of acetonitrile was added over a 5-minute period to a stirred solution of 2.16 g. (0.01 mole) of tetracyano-1,4-dithiin in 200 ml. of acetonitrile containing 2.0 ml. of water. The reaction was conducted at about 20° C. and in an atmosphere of nitrogen. The resulting dark brown solution containing the tetracyanoethylene ion radical (as shown in separate experiments by electron paramagnetic resonance measurements and visible spectroscopy) was cooled to a temperature between —5 and 0° C., and chlorine was slowly passed through it by means of a gas inlet tube until disappearance of the dark color. The reaction mixture was then allowed to warm up to about room temperature and filtered to remove the insoluble potassium chloride (1.71 g.) which had formed. Removal of the solvent from the pale yellow filtrate under diminished pressure left a solid residue from which, on sublimation at 100–200° C. under 0.1 mm. pressure, 0.307 g. of tetracyanoethylene was obtained (24% yield based on the tetracyano-1,4-dithiin). It was identified by its color reaction with N,N-dimethylaniline (blue changing to red) and with anthracene (transitory green color preceding the formation of the white crystalline Diels-Alder adduct).

EXAMPLE II

Using essentially the procedure of Example I, a suspension of 1.32 g. (0.02 mole) of potassium cyanide in 100 ml. of acetonitrile containing 2.0 ml. of water was added over a 30-minute period to a stirred solution of 2.16 g. (0.01 mole) of tetracyano-1,4-dithiin in 100 ml. of acetonitrile cooled to between —10 and —14° C. After being stored overnight at —80° C., the dark brown solution containing potassium tetracyanoethylenide was allowed to warm to 0° C., then cooled again to between —20 and —30° C., at which temperature chlorine was added until the dark brown color was replaced by a clear yellow color. After removal of the inorganic solids by filtration and evaporation of the filtrate under diminished pressure, there was obtained 3.2 g. of a solid residue which was a mixture of tetracyanoethylene and tetracyano-1,4-dithiin. Sublimation of a 1-g. portion of this crude product at 100–200° C. and under 0.1 mm. pressure gave 0.1255 g. of tetracyanoethylene, characterized as in Example I. Crystallization of the sublimation residue from methylene dichloride gave some regenerated tetracyano-1,4-dithiin as yellow-brown needles, M.P. 199–205° C., further characterized by comparison of its infrared spectrum with that of an authentic sample. The yield of tetracyanoethylene was 31% of the theory.

EXAMPLE III

In this example, the apparatus consisted of a three-neck flask equipped with magnetic stirrer, gas inlet tube, reflux condenser and a vertical column (a modified chromatography column) which served as the reactor for the reaction between the alkali metal cyanide and the cyanosulfiide. The flask served as a separate reactor for the treatment of the solution flowing from the column (the eluent) with halogen in the oxidation step. The column was equipped with a liquid trap to prevent access of halogen vapors to the alkali metal cyanide, and a pressure-equalizing dropping funnel was attached to the top of the column. An atmosphere of nitrogen was maintained above and below the column.

The reactor column was packed with approximately 10 g. (a large excess) of potassium cyanide. A solution of 6.48 g. (0.03 mole) of tetracyano-1,4-dithiin in 175 ml. of acetonitrile was dropped through the reactor column at ambient temperature (20–25° C.) over a period of 1.5 hours, after which the column was washed with 100 ml. of acetonitrile. Eluent and washings, containing the potassium tetracyanoethylenide, were collected in the flask below the reactor column. As the dark-brown solution flowed into the flask, where it was cooled to between −20 and −30° C., chlorine was simultaneously passed through it at such a rate as to be present in slight excess. At the end of this operation, the solution in the flask was pale yellow. The suspended inorganic solids were removed by filtration and the filtrate was evaporated in vacuo at room temperature. A small amount of diatomaceous earth was added to the residual semisolid to aid its transfer to a sublimation apparatus. Sublimation at 70–170° C. and 1 mm. pressure gave 2.31 g. (60% yield) of tetracyanoethylene. From the sublimation residue was obtained 0.25 g. of tetracyano-1,4-dithiin and 0.04 g. of tetracyanothiophene, M.P. 188–192° C., the latter resulting from pyrolysis during sublimation of a portion of the recovered tetracyano-1,4-dithiin.

EXAMPLE IV

The procedure of Example III was repeated except that approximately 10 g. (excess) of sodium cyanide replaced the potassium cyanide in the reactor column. From 2.16 g. (0.01 mole) of tetracyano-1,4-dithiin in 200 ml. of acetonitrile was obtained an eluent of dark brown color. Chlorination at a temperature between −20 and −10° C. gave a transitory green solution followed by a yellow solution containing suspended solids. Subsequent work-up as in Example III gave tetracyanoethylene in 25% yield.

EXAMPLE V

Following the procedure of Example III, a solution of 4.32 g. (0.02 mole) of tetracyano-1,4-dithiin in 150 ml. of acetonitrile was passed through the potassium cyanide reactor column over a 30-minute period. The simultaneous addition of 6.4 g. (0.04 mole) of bromine dissolved in 50 ml. of acetonitrile to the eluent at about −20° C. developed a transitory green color, followed by the formation of an orange solution containing suspended inorganic solids. Subsequent work-up as in Example III gave 0.83 g. (32.5% yield) of tetracyanoethylene as a white crystalline solid, identified by the usual color tests.

As already mentioned, sulfur halides normally form to at least some extent during oxidation by treatment with a halogen. In this respect, the use of bromine instead of chlorine offers a certain advantage in that the presence of sulfur chlorides complicates the separation of tetracyanoethylene by sublimation or distillation. On the other hand, due to the inherent instability of sulfur bromide, this impurity is not observed in the recovery of tetracyanoethylene when bromine is used as the oxidizing agent.

EXAMPLE VI

A solution of 4.32 g. (0.02 mole) of tetracyano-1,4-dithiin in 150 ml. of acetonitrile was stirred at 23° C. while a suspension of 3.78 g. (0.02 mole) of finely ground barium cyanide in 200 ml. of acetonitrile was added over a period of one hour. The reaction was carried out in air and with technical (unpurified) acetonitrile. Examination of the visible spectrum of the reddish-brown solution indicated absorptions for the tetracyanoethylene ion radical in the 400–465 m$\mu$ region. After an additional one-half hour, the reaction mixture was cooled to −30° C. and treated with gaseous chlorine. The reddish-brown color faded to a transitory bright green, and, ultimately, a yellow solution containing suspended solids was obtained. The solids were removed by filtration and to the filtrate was added a small amount of diatomaceous earth. Removal of the solvents from the filtrate and sublimation at 135° C. and 0.1 mm. pressure gave 0.44 g. (17% yield) of tetracyanoethylene, identified by the usual color tests.

EXAMPLE VII

The apparatus and procedure of Example III were used with a different cyanosulfide. A solution of 3.86 g. (0.0179 mole) of 4,5-dicyano-1,3-dithiole-$\Delta^{2,\alpha}$-malononitrile in 120 ml. of acetonitrile was passed through the potassium cyanide reactor column at 20–25° C. over a 30-minute period, after which the column was washed with 80 ml. of acetonitrile. This reaction, which was exothermic, gave a black eluent which was shown by visible spectroscopic analysis to contain the tetracyanoethylene anion radical. The solution was chlorinated at −20° C. to give an orange-brown solution containing some suspended solids. After filtration, the solvent was removed from the filtrate by evaporation in vacuo. Sublimation of the residue at 60–190° C. under diminished pressure gave 0.17 g. of crude tetracyanoethylene, which was characterized by its color reactions with anthracene and N,N-dimethylaniline.

EXAMPLE VIII

Another cyanosulfide was used as the source of tetracyanoethylene, following the procedure of Example III. A solution of 2.5 g. (0.01 mole) of 3-cyano-[1,3]-dithiolo-[4,5-c]-isothiazole-$\Delta^{5,\alpha}$-malononitrile in approximately 800 ml. of acetonitrile was flowed through the potassium cyanide reactor column at 20–25° C. over a period of approximately 2 hours. The eluent was yellow-orange in color and was shown by spectroscopic examination to contain the tetracyanoethylene anion radical. It was treated with chlorine at −20° C. although towards the end the reaction mixture was allowed to warm up to room temperature. There was thus obtained a pale yellow solution containing suspended inorganic material. After filtration and removal of the solvent in vacuo, a small amount of diatomaceous earth was added to aid in transferring the semisolid residue to a sublimation apparatus. Sublimation gave 1.01 g. (78% yield) of crude tetracyanoethylene (containing some sulfur chlorides) which was identified by the usual color tests.

EXAMPLE IX

The apparatus and procedure of Example III were used with yet another cyanosulfide. A solution of 2.48 g. (0.01 mole) of p-dithiino-[c]-isothiazole-3,5,6-tricarbonitrile in 150 ml. of acetonitrile was passed through the potassium cyanide reactor column at 20–25° C. over a 30-minute period, followed by 100 ml. of acetonitrile to wash the column. The dark colored eluent contained the tetracyanoethylene anion radical, as shown by spectral data. Treatment with chlorine at −20° C. gave a yellow solution containing suspended inorganic solids. After filtration and removal of the solvent in vacuo, sublimation of the residue gave 0.31 g. (24% yield) of tetracyanoethylene, identified by the usual color tests.

Since obvious modifications and equivalents in the invention will be evident to those skilled in the chemical arts, I propose to be bound solely by the appended claims.

The embodiments of the invention in which an exclusive property or privilege is claimed are defined as follows:

1. A process of preparing tetracyanoethylene which comprises (a) reacting a heterocyclic cyanosulfide of the group consisting of tetracyano-1,4-dithiin, p-dithiino-[c]-isothiazole-3,5,6-tricarbonitrile, 4,5-dicyano-1,3-dithiole-$\Delta^{2,\alpha}$-malononitrile and 3-cyano-[1,3]-dithiolo-[4,5-c]-isothiazole-$\Delta^{5,\alpha}$-malononitrile with a compound of the group consisting of alkali metal cyanides and alkaline earth metal cyanides and (b) treating the reaction product from step (a) with an oxidizing agent, steps (a) and (b) being conducted in a substantially inert liquid medium which is at least a partial solvent for the reactants and tetracyanoethylene, said medium being composed of at least one aliphatically saturated organic compound which consists of carbon, hydrogen bonded to carbon, and at least one additional element of the group consisting of oxygen, sulfur and nitrogen.

2. A process which comprises reacting a heterocyclic cyanosulfide selected from the group consisting of tetracyano-1,4-dithiin, p-dithiino-[c]-isothiazole-3,5,6-tricarbonitrile, 4,5-dicyano-1,3-dithiole-$\Delta^{2,\alpha}$-malononitrile and 3-cyano-[1,3]-dithiolo-[4,5-c]-isothiazole-$\Delta^{5,\alpha}$-malononitrile with a cyanide selected from the group consisting of alkali metal cyanides and alkaline earth metal cyanides, in a substantially inert liquid medium which is at least a partial solvent for the reactants and tetracyanoethylene, and treating the reaction product with a halogen selected from the group consisting of chlorine and bromine thereby producing tetracyanoethylene said medium being composed of at least one aliphatically saturated organic compound which consists of carbon, hydrogen bonded to carbon, and at least one additional element of the group consisting of oxygen, sulfur and nitrogen.

3. The process of claim 2 wherein the cyanosulfide is tetracyano-1,4-dithiin.

4. The process of claim 2 wherein said cyanide is a cyanide of an alkali metal of atomic number 11–55.

No references cited.